(12) United States Patent
Eckardt

(10) Patent No.: US 7,132,085 B2
(45) Date of Patent: Nov. 7, 2006

(54) METHOD FOR THE CATALYTIC OXIDATION OF A GAS, RECOMBINATION DEVICE FOR CARRYING OUT THE METHOD, AND SYSTEM WHICH INCLUDES THE RECOMBINATION DEVICE

(75) Inventor: Bernd Eckardt, Bruchköbel (DE)

(73) Assignee: Framatome ANP GmbH, Erlangen (DE)

( * ) Notice: Subject to any disclaimer, the term of this patent is extended or adjusted under 35 U.S.C. 154(b) by 609 days.

(21) Appl. No.: 10/358,904

(22) Filed: Feb. 4, 2003

(65) Prior Publication Data
US 2003/0161786 A1 Aug. 28, 2003

(30) Foreign Application Priority Data
Feb. 4, 2002 (DE) ............... 102 04 450

(51) Int. Cl.
- G21C 9/00 (2006.01)
- B01D 50/00 (2006.01)
- F28D 21/00 (2006.01)
- B01J 8/02 (2006.01)
- B01J 19/24 (2006.01)

(52) U.S. Cl. ............ 422/168; 422/205; 422/220; 422/230; 376/300; 376/301

(58) Field of Classification Search ............ 422/168, 422/177; 376/300, 301
See application file for complete search history.

(56) References Cited

U.S. PATENT DOCUMENTS 3,907,981 A 9/1975 Henrie

FOREIGN PATENT DOCUMENTS

| DE | 1 442 821 | 12/1968 |
| DE | 2 411 006 | 9/1974 |
| DE | 28 52 019 | 6/1979 |
| GB | 1013888 | 12/1965 |

*Primary Examiner*—Glenn Caldarola
*Assistant Examiner*—Tom Duong
(74) *Attorney, Agent, or Firm*—Laurence A. Green; Werner H. Stemer; Ralph E. Locher

(57) ABSTRACT

In a method for catalytic oxidation of a gas, the outlay required is kept at a low level for reliably treating even relatively large quantities of gas and/or high concentrations of the gas fraction that needs to be treated. For this purpose, a gas stream including the gas being treated is circulated through a reaction zone and a return-flow zone, which is in communication with the inlet and outlet sides of the reaction zone. The circulation of the gas stream can be maintained effectively in the form of a passive system if the gas stream which includes the gas to be treated is guided in the upward direction in the reaction zone and the upward flow is assisted by convection resulting from the heat released during the oxidation reaction. Furthermore, the gas stream is preferably cooled locally in the return-flow zone by spray cooling.

14 Claims, 3 Drawing Sheets

METHOD FOR THE CATALYTIC OXIDATION OF A GAS, RECOMBINATION DEVICE FOR CARRYING OUT THE METHOD, AND SYSTEM WHICH INCLUDES THE RECOMBINATION DEVICE

BACKGROUND OF THE INVENTION

Field of the Invention

In many industrial plants, malfunctions or accidents may lead to the release of combustible gases, such as for example, hydrogen, tritium or hydrocarbon compounds. If the concentration of combustible gases of this type exceeds a threshold value, which is specific to the particular substance, combustion reactions may occur and these reactions may endanger the operational reliability of the industrial plant. In particular, in a nuclear engineering plant, in the event of abnormal events or accidents in which oxidation of zirconium may occur, for example, because of core heat-up, it is necessary to deal with hydrogen gas and carbon monoxide being released within the containment that surrounds the reactor core. Particularly after an accident involving a loss of coolant, large quantities of hydrogen can be released. As a result, explosive gas mixtures may form within the containment. If no measures are taken to combat this, increased levels of hydrogen in the containment atmosphere are possible to such an extent that in the event of accidental ignition the combustion of a relatively large quantity of hydrogen could endanger the integrity of the containment. The containment atmosphere may be subject to, in some cases, considerable activities in aerosol or gas form.

The formation of explosive mixtures of this type is conceivable, for example, during power operation of light water reactors. Alternatively, in the case of boiling water reactor (BWR) plants, continuous radiolysis gas formation may also occur in the core region. Furthermore, when a reactor plant is being operated with excess hydrogen in the coolant, for example, in order to substantially avoid net radiolysis gas production in the core region of a pressurized-water reactor (PWR), a highly concentrated hydrogen mixture may be released into the containment atmosphere during the gas stripping of the coolant in order to reduce rare-gas activities in the circuits. Similarly highly concentrated reaction gases, in particular hydrogen or tritium, may also form during other processes carried out in the nuclear engineering plant, such as for example, during the disposal of sodium from breeder reactors, as a result of targeted reaction of sodium with water and/or carbon dioxide.

To prevent the formation of explosive gas mixtures in the containment of a nuclear engineering plant as a result of phenomena of this nature, various devices or methods have been discussed. These include, for example, devices such as catalytic recombiners, catalytically and/or electrically operated ignition devices or a combination of the two devices mentioned above, as well as methods involving permanent or retrospective inerting of the containment. In the case of BWR plants, it is possible to provide for systems of this type to be used in conjunction with continuous extraction in the turbine condenser region, since the concentration of gases requiring treatment occurs predominantly in the condenser regions.

When a catalytic recombiner is being used to eliminate the hydrogen from the atmosphere of the containment by controlled oxidation thereof using a catalyst, it is intended in particular that early and flame-free recombination of the hydrogen with oxygen should be achieved. The intention is to reliably avoid a significant build-up of pressure as a result of a virulent combustion of hydrogen. To be able to satisfy these stipulations including with regard to the heat which is usually released as a result of the recombination or oxidation reaction, catalytic recombiners are usually designed exclusively to convert gases with a relatively low proportion of combustible gases which lies well below the ignition limit, i.e. a maximum entrained hydrogen content of 4% by volume. Particularly when designing for accidents in which it is likely that relatively large quantities of combustible gases will be released, therefore, recombination devices which have correspondingly large dimensions and are therefore expensive to produce are provided.

SUMMARY OF THE INVENTION

It is accordingly an object of the invention to provide a recombination device, a system, and a method for the catalytic oxidation of a gas, which overcome the above-mentioned disadvantages of the prior art apparatus and methods of this general type.

With the foregoing and other objects in view there is provided, in accordance with the invention, a method for catalytically oxidizing a gas. The method includes steps of: providing a reaction zone having an inlet side and an outlet side; providing a return-flow zone communicating with the inlet side of the reaction zone and with the outlet side of the reaction zone; and circulating a gas stream through the reaction zone.

In accordance with an added mode of the invention, an upward flow is provided by guiding the gas stream in an upward direction in the reaction zone; the upward flow being assisted or maintained by convection as a result of heat being released during an oxidation reaction.

In accordance with an additional mode of the invention, an ejector is used to assist the upward flow of the gas stream.

In accordance with another mode of the invention, a downward flow is provided by guiding the gas stream in a downward direction in the return-flow zone; and the downward flow is assisted by locally cooling the gas stream.

In accordance with a further mode of the invention, spray cooling is used to perform the step of locally cooling the gas stream.

In accordance with another mode of the invention, a steam partial pressure of more than 50% is established in at least the reaction zone and/or the return-flow zone.

In accordance with another added mode of the invention, the method includes setting the steam partial pressure by controlling cooling of sump water located beneath at least one zone selected from a group consisting of the reaction zone and the return-flow zone.

In accordance with another additional mode of the invention, the method includes mixing the gas stream with steam before the gas stream first enters the reaction zone such that a steam content of more than 50% is established.

In accordance with yet an added mode of the invention, the method includes establishing a concentration of a gas fraction that will be oxidized to be more than 6% by volume of the gas stream before the gas stream enters the reaction zone.

In accordance with yet an additional mode of the invention, the method includes establishing a concentration of a gas fraction that will be oxidized to be more than 50% by volume of the gas stream before the gas stream enters the reaction zone.

With the foregoing and other objects in view there is also provided, in accordance with the invention, a recombination device for catalytically oxidizing a gas. The recombination device includes: a reaction zone having an inlet side and an outlet side; a return-flow zone communicating with the inlet side of the reaction zone and with the outlet side of the reaction zone such that a gas stream can be circulated; and a common housing in which the reaction zone and the return-flow zone are configured.

In accordance with an added feature of the invention, the reaction zone is formed by a stack through which convective flow is possible.

In accordance with an additional feature of the invention, a plurality of catalyst elements are configured in the reaction zone.

In accordance with another feature of the invention, each one of the plurality of catalyst elements is designed as a catalyst plate having a washcoat surface based on platinum or palladium; and the plurality of catalyst elements are configured at a distance of approximately 0.5 to 2 cm from one another.

In accordance with a further feature of the invention, a plurality of spray nozzles are provided for receiving a coolant. The plurality of spray nozzles are configured in the return-flow zone.

In accordance with a further added feature of the invention, an ejector is connected upstream of the inlet side of the reaction zone.

In accordance with a further additional feature of the invention, a catalytic further purification stage is integrated in the common housing. The catalytic further purification stage has an outlet connected to an off-gas system.

In accordance with another feature of the invention, a cooling unit connects the further purification stage to the off-gas system.

In accordance with another added feature of the invention, the further purification stage includes a plurality of catalyst plates. The plurality of catalyst plates are configured at a distance of approximately 0.2 to 1 cm from one another.

In accordance with yet an added feature of the invention, the further purification stage is designed as a stack through which convective flow is possible.

With the foregoing and other objects in view there is provided, in accordance with the invention, a system for catalytically oxidizing a gas. The system includes the recombination device described above, and a steam injector unit connected upstream from the recombination device.

With the foregoing and other objects in view there is provided, in accordance with the invention, a system for catalytically oxidizing a gas. The system includes the recombination device described above, and an activated-carbon hold-up line connected downstream from the recombination device.

The invention is based on the object of providing a method for the catalytic oxidation of a gas, which keeps the required outlay particularly low even if relatively large quantities of gas are to be treated reliably. Furthermore, it is intended to provide a recombination device that is particularly suitable for carrying out the method and a system that includes a recombination device of this type.

In terms of the method, this object is achieved, as a result of a gas stream that includes the gas to be treated being circulated through a reaction zone and through a return-flow zone that is in communication with the reaction zone on the inlet and outlet sides.

The invention is based on the consideration that the required outlay, in particular with regard to the number of components required and the dimensions thereof, can be kept particularly low, even for reliable treatment of relatively large quantities of the gas to be treated, if the systems required are designed to be fed with a gas stream that may have a relatively high proportion of the gas that is to be treated. In particular, it should be possible for the gas stream to have a hydrogen content of, for example, up to 20% by volume or more, possibly even up to almost 100% by volume, instead of the permissible upper limit for the hydrogen content of approximately 4% by volume which has previously been used as the basis for design, without effective and reliable oxidation or recombination of the combustible gas fraction or hydrogen fraction being impaired. Effective oxidation or recombination could be impaired in particular in the event of a relatively high reaction temperature of, for example, more than 700° C., which is established as a result of the high concentration of hydrogen and could lead to changes to the microstructure of the crystals or crystallites that form the actual catalyst. To ensure that the reaction temperature is reliably limited even when there is a relatively high concentration of hydrogen, it is provided for the gas stream including the gas which is to be oxidized to be passed a number of times through a spatial area, namely a reaction zone, so that it is in effect diluted, by the oxidation or recombination of the combustible gas. For this purpose, the gas stream that includes the gas to be treated is circulated in a system in which a reaction zone is connected to a return-flow zone on the inlet and outlet sides in order to form a circulating flow path.

For particularly high operational reliability during the catalytic oxidation of the gas, the systems used for this purpose are advantageously designed as passive systems, in which it is made possible to reliably maintain operation even without external influence measures and in particular without external supply of energy. For this purpose, the gas stream which includes the gas to be treated is advantageously guided in the upward direction in the reaction zone, and the upward flow is assisted or maintained by convection as a result of the heat which is released during the oxidation reaction. This allows targeted utilization of the heat that is released during the oxidation reaction to maintain the gas circulation as a result of a stack effect in the reaction zone. To further assist the gas flow, in a further advantageous configuration, a gas-jet pump device or an ejector is used.

In the return-flow zone, the gas stream is advantageously guided in the downward direction, and the downward flow is assisted by local cooling of the gas stream. The cooling may be carried out using surface coolers, in which case a desired temperature level may be set in a targeted fashion, and if necessary combined use with heater rods may be implemented in order to achieve a thermal cycle reaction. In a particularly advantageous refinement, however, the local cooling of the gas stream is effected by spray cooling. The spray cooling, in particular, in the return-flow region of the gas stream, especially in combination with the upward flow assisted by convection in the reaction zone, assists the circulation of the gas stream, with the additional effect of homogenizing the gas stream that is flowing out of the reaction zone and has therefore been partially treated. Depending on the coolant selected for the spray cooling, moreover, it becomes possible to retain aerosol or iodine in the gas stream as a result of conditioning with NaOH and/or $Na_2S_2N_3$.

To achieve a particularly high operational reliability in particular when treating a gas stream with a relatively high combustible gas or hydrogen content of, for example, 20% by volume or more, it is advantageous for the gas stream to be treated in an inert atmosphere. For this purpose, it is expedient for a steam partial pressure of more than 50% to be established in the reaction zone and/or in the return-flow zone, in particular since steam has a relatively strong inhibiting action, so that even a steam content of 50–55% by volume is sufficient to rule out combustion of hydrogen/oxygen mixtures. The steam partial pressure is advantageously set by controlled cooling of sump water that is located beneath the reaction zone and/or the return-flow zone and is in turn used as a coolant for feeding to the spray nozzles.

Moreover, particularly high operational reliability can be achieved if, advantageously, the formation of possibly explosive gas mixtures is consistently avoided even before the gas stream is first fed into the reaction zone. For this purpose, the gas stream is advantageously mixed with steam before it first enters the reaction zone, in such a manner that a steam content of more than 50% is established. As an alternative or in addition, it is advantageous for the fraction of gas that is to be oxidized, in particular of hydrogen which is to be oxidized, to be set to more than 6% by volume, preferably more than 10% by volume, expediently more than 50% by volume, in the gas stream before it first enters the reaction zone.

The object relating to the recombination device for the catalytic oxidation of a gas is achieved as a result of a reaction zone and a return-flow zone, which are in communication with one another on the inlet and outlet sides in such a manner that a gas stream that includes the gas to be treated can be circulated. The reaction zone and the return-flow zone are arranged in a common housing.

The recombination device therefore enables the gas that is to be treated to be passed through the reaction zone a number of times, during which the level of the gas that is to be treated can be reduced to an increasing extent. When an as yet untreated gas stream is fed in, first of all it is mixed with the gas stream which is already circulating, so that as soon as the newly supplied gas stream is fed in, the entrained combustible gas fraction is initially diluted, and therefore the reaction temperature in the device can also reliably be limited to less than approximately 500° C. to 800° C. Therefore, even when there is a relatively high level of the entrained combustible gas, the gas can be reliably broken down while spontaneous ignition or the formation of explosive gas mixtures can be definitively avoided. Furthermore, arranging the reaction zone and the return-flow zone in a common housing enables the dimensions of the recombination device to be relatively small and also enables the recombination device to be configured such that it can be used on a decentralized footing. Therefore, targeted use of a recombination device of this type becomes possible in particular in local areas in which it is particularly likely that relatively large quantities of the combustible gas will be released.

Passively maintaining the circulation of the gas stream within the recombination device substantially without having to supply external energy can be achieved by utilizing a convection effect resulting from a stack effect within the recombination device. For this purpose, the reaction zone is advantageously formed by a stack that is arranged inside the housing and through which convective flow is possible.

It is preferable for a number of catalyst elements which initiate and assist the oxidation or recombination of the gas being treated to be arranged in the reaction zone of the recombination device. Particularly where it is intended to treat hydrogen as a combustible gas, the catalyst elements are preferably based on platinum or palladium. The catalyst elements are each expediently designed as a catalyst plate with a washcoat surface. Catalyst elements of this type include, for example, a number of metallic support sheets, to each of which is applied, what is known as a ceramic washcoat, i.e. a porous, large-pore body—the active surface of which is increased by a factor of, for example, 1000 compared to the geometric surface area. In this case, for the washcoat, the catalytically active precious metals are applied finely distributed in the form of fine crystals at different depths. To make it possible to achieve a high degree of conversion during the treatment of the gas, on the one hand, and a flow through the reaction zone with only a low pressure loss, on the other hand, the catalyst plates are expediently arranged with their main planes substantially parallel to one another and at a distance of approximately 0.5–2 cm from one another.

To assist the circulation of the gas stream in the recombination device and in particular also the convection-assisted circulation to a particular degree, it is advantageous for a number of spray nozzles, to which a coolant can be fed, to be arranged in the return-flow zone. The spray cooling of the gas stream in the return-flow region which becomes possible as a result, on account of the associated drop in temperature, first assists the circulation of the gas stream and second, on account of the associated turbulence effects, leads to homogenization of the gas stream flowing out of the reaction zone. If the coolant is selected appropriately, and in particular if a coolant that includes NaOH and/or $Na_2S_2N_3$ is used, moreover, it is possible to condition the gas stream in the return-flow zone in order to retain aerosols and/or iodine.

Moreover, particular assistance to the circulation of the gas stream in the recombination device can be achieved if the gas stream is fed into the recombination device expediently in the manner of a targeted injection in the intended direction of flow of the gas stream in the reaction zone. For this purpose, it is advantageous for a gas-jet pump device, to which the gas stream which is to be fed to the recombination device, to be connected upstream of the reaction zone on the inflow side. The gas-jet pump device, which is also known as an ejector, has an outer region with a cross section of flow that is narrowed on the gas stream side. The outer region causes gas to be accelerated in the gas stream and ambient atmosphere to be sucked in. This device could also be designed in the manner of a venturi nozzle for sucking in liquids, in which case, particularly effective gas purification can be achieved.

To make it possible to maintain particularly low residual concentrations of the gas to be treated in the gas stream flowing out of the recombination device, it is advantageous for a catalytic further purification stage, which on the outlet side is connected to an off-gas system, to be integrated in the housing of the recombination device. The catalytic further purification stage allows a further targeted treatment before the treated gas stream is discharged to the off-gas system, making it possible, for example, to achieve residual hydrogen contents in the treated gas stream of less than 0.1% by volume.

The further purification stage may be in the form of a fully ceramic bulk-bed catalyst, for example, including beads or pellets, or of a catalyst which has been applied to ceramic plates.

To allow particularly effective further treatment of the gas stream which is to be discharged, the further purification stage advantageously includes a number of catalyst plates which are arranged at a particularly short distance of approximately 0.2–1 cm from one another. Particularly effective further treatment of the gas stream to be discharged can also be achieved if the further purification stage is connected to the off-gas system preferably via a cooling unit.

The cooling unit may in this case be designed in particular as a cooling coil which is connected downstream of the further purification stage on the outlet side. Particularly when spray nozzles are being used in the return-flow region of the recombination device, a cooling coil of this type can preferably have the coolant emerging from the spray nozzles applied to it on the secondary side.

In a further advantageous configuration, the further purification stage of the recombination device is designed such that it can be heated electrically or by the surrounding catalyst. Therefore, particularly in combination with a reaction zone, it becomes possible to operate the recombination device at elevated operating temperatures, so that high reaction rates can be achieved.

Particularly reliable operation of the recombination device is possible even when a gas stream is being treated with a relatively high level of gas to be treated, such as for example 20% by volume or more, if the gas stream flowing to the recombination device undergoes prior inerting. For this purpose, the recombination device is advantageously used in a system for the catalytic oxidation of a gas which includes a steam injector unit connected upstream of the recombination device on the gas stream side. The steam injector unit makes it possible to apply steam to the gas stream flowing to the recombination device in such a manner that a steam content of 50% by volume or more is established. In a gas stream pre-treated in this way, the formation of an ignitable mixture even where there is a relatively high level of the combustible gas is reliably ruled out, so that the risk of ignition is reliably avoided even when the gas stream is fed directly into the relatively hot reaction zone.

In an alternative or additional advantageous configuration, an activated-carbon hold-up line is connected within the system for the catalytic oxidation of a gas and downstream of the recombination device. A system of this type allows combined gas treatment and activity retention, so that in particular, use for a relatively highly loaded containment atmosphere of a nuclear power plant becomes possible, reliably and with a high level of efficiency, even after relatively serious incidents. In this context, it is advantageously possible to provide for advance feeding of inert gas into the activated-carbon supply line, for example, from nitrogen cylinders, so that a substantially oxygen-free absorption operation becomes possible and therefore ignition of the activated carbon is reliably avoided even in the event the production of considerable after-heat.

The advantages that are achieved by the invention consist in particular in the fact that circulation of the gas stream allows repeated flow through the reaction zone and therefore catalytic oxidation or recombination of the gas fraction to be treated to takes place in a plurality of successive steps. When the gas stream, which is still completely untreated is fed into this circuit, it is first of all diluted as a result of being introduced into the gas stream that has at least in part already been treated. Therefore, it is overall possible to achieve a high decomposition rate of the gas to be treated, while spontaneous ignition of the combustible gas is reliably avoided even if a relatively highly laden gas stream is fed in. Therefore, it becomes possible to treat a gas stream even with a relatively high level of combustible gas, such as for example, 20% by volume or more, without the reaction temperature rising above a limit value that has to be maintained for the catalyst system to operate reliably.

The utilization of the stack effect in the reaction zone by using a flow which is maintained or assisted by convection, in particular, in combination with the cooling of the gas stream in the return-flow region and assisted by the inflow ejector or the gas-jet pump device, means that intensive circulation of the gas stream can be achieved in the manner of a passive configuration without having to use an external supply of energy, and consequently it becomes possible to achieve a relatively high decomposition rate of the combustible gas fraction. If the recombination device used for this purpose is dimensioned appropriately, it is possible, for example, to produce an internal recirculation rate which corresponds to five times the process gas volumetric flow, and therefore to achieve a significant reduction in the level of combustible gas in the recombination unit to, for example, one fifth.

Given suitable dimensions, intensive internal circulation of the total gas volume located in the recombination device can be achieved within a few seconds, for example, less than five seconds.

The combination of the reaction zone, the return-flow zone or the cooling zone and the inerting zone in a common housing and the passive generation and maintaining of the circulating flow means that the outlay on equipment required is kept at a particularly low level even when relatively large quantities of combustible gas are being treated. In particular, the circulation of the gas stream in the recombination device makes it possible to keep its capacity particularly high even when it has relatively small dimensions and therefore involves relatively little outlay on materials. In terms of the dimensions, it is possible to make the devices or components smaller by a factor of 2 to 5 compared to known installations. A compact design of this nature is also made possible, in particular, by the fact that it is possible to supply the untreated gas stream to the recombination device in only slightly diluted form or even in entirely undiluted form by using a carrier gas, since the recombination device makes it possible to process a gas stream in which there is a high level of gas requiring treatment.

Particularly in the case of a BWR which, for example, is operated continuously in power operation, combining the recombination device with an evacuation device assigned to the turbine condenser, preferably a steam injector with an intermediate condenser or a water ring pump system with dilution steam being fed in directly after the compression, makes it possible to reduce the amount of dilution steam by a factor of up to approximately 5. This operating mode, therefore, makes it possible to achieve a considerable saving on steam and therefore a particularly high overall efficiency of the reactor installation, and in addition, it is also possible to hugely decrease the size of the components, i.e. to achieve a particularly compact design. The internal circulation in the reaction device then produces the dilution, followed by the oxidation at limited reaction temperatures.

In the case of coolant gas stripping in a PWR plant, the method allows the highly concentrated entry gas, which has a considerable hydrogen concentration, and if necessary which has been diluted just slightly in order for it to be conveyed, to be introduced directly into the recombination device. In this application, the hydrogen oxidation can take place in the internal circuit following oxygen being fed in and without further inert gas being supplied. In this case, moreover, the rare-gas activities emerging, which are only slightly diluted, can be introduced into a downstream activated-carbon installation, in which case, because of the small gas streams remaining, it is possible to provide a relatively small activated-carbon hold-up line.

Other features which are considered as characteristic for the invention are set forth in the appended claims.

Although the invention is illustrated and described herein as embodied in a method for the catalytic oxidation of a gas, and recombination device for carrying out the method, and system which includes a recombination device of this type, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Identical parts are provided with the same reference symbols throughout all of the figures.

Figure 1:
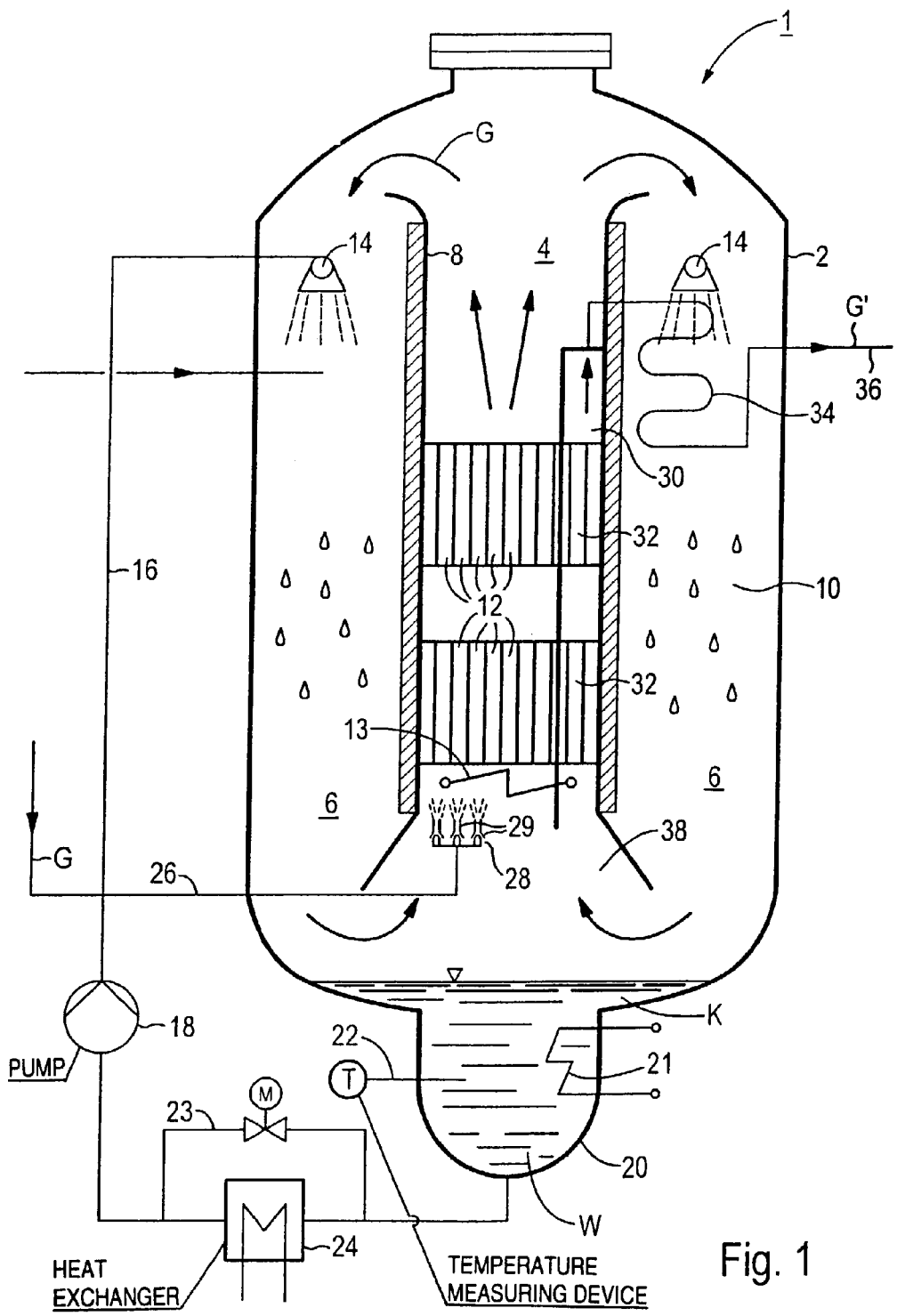
FIG. 1 is a view of a recombination device for the catalytic oxidation of a gas.

Referring now to the figures of the drawing in detail and first, particularly, to FIG. 1 thereof, there is shown a recombination device 1 that is designed for the catalytic oxidation—also known as recombination—of a combustible gas, which is hydrogen in the exemplary embodiment. The recombination device 1 is configured in such that, with high operational safety, reliable treatment even of a gas stream G that carries a relatively high level of hydrogen, for example, 20% by volume or more, is possible.

To enable this to be achieved, the recombination device 1 is designed for the gas stream G to be circulated in its interior. To this end, the recombination device 1 includes a housing 2, within which both a reaction zone 4 and a return-flow zone 6 that is in communication with the inlet side and the outlet side of the reaction zone 4, are arranged. In the exemplary embodiment, the recombination device 1 has substantially cylindrical symmetry along its longitudinal axis, although it is also possible for other suitable geometries to be selected.

In the exemplary embodiment, the housing 2 is configured in the form of a cylindrical casing over the majority of its area. Within the housing 2, a cylinder casing 8, which laterally delimits the reaction zone 4 and forms a stack on account of its elongate configuration, is arranged centrally. The return-flow zone 6 in the exemplary embodiment is formed by the annular chamber 10 delimited by the region of the housing 2 that is in the form of a cylinder casing and by the cylinder casing 8. The inlet and the outlet side of the reaction zone 4, which is laterally delimited by the cylinder casing 8, are in gas communication, via corresponding overflow regions. The annular space 10 forms the return-flow zone 6, so that it becomes possible to circulate the gas stream G through the reaction zone 4 and the return-flow zone 6.

A number of catalyst elements 12 are arranged in the reaction zone 4, which is delimited by the cylinder casing 8. The catalyst elements 12 are configured in the manner of a stack. The catalyst elements 12 are each designed to assist a recombination reaction between hydrogen and oxygen to form water, and each substantially includes a catalytically active surface based on platinum or palladium. The catalyst elements 12 are each designed as catalyst plates that are designed as a washcoat in order to provide a relatively large catalytically active internal surface area. The support plate for each catalyst plate may be selected from suitable, for example, ceramic or metallic, material.

The recombination device 1 is intended to circulate the gas stream G. The circulation is assisted or maintained by convection in the manner of a passive system as a result of the stack effect within the cylinder casing 8. The gas stream G is guided in an upward direction in the region of the reaction zone 4 and in a downward direction in the region of the return-flow zone 6. It is intended for the heat that is released as a result of the exothermic reaction during the catalytic oxidation of the hydrogen at the catalyst elements 12 to be utilized to assist or maintain the circulation.

To enable this convectively assisted or maintained gas flow to take place in a suitable way, the catalyst elements 12 overall are designed to have a relatively low flow resistance combined with, at the same time, a relatively large catalytically active surface area. For this purpose, in the exemplary embodiment, the catalyst elements 12 designed as catalyst plates are arranged in two stages, in each case with their main planes substantially parallel to one another, and are spaced apart from one another by approximately 1 cm, and therefore between 0.5 and 2 cm, so that the stack formed by the catalyst elements 12 in each case effects only a relatively low pressure loss for the circulating gas stream G. In the exemplary embodiment, two stacks of the catalyst elements 12 are arranged one behind the other, as seen in the direction of flow of the gas stream G within the cylinder casing 8. The dimensions of the catalyst elements 12 are in each case such that their respective catalyst height amounts to at least 5% of the stack height, i.e. of the height of the cylinder casing 8.

To assist the upward flow maintained by convection within the reaction zone 4 if necessary, and for initial drying and temperature-control of the catalyst, a heating device 13 is connected upstream of the reaction zone 4 on the gas flow side, i.e. in its lower region. This heating device 13 can be used to promote the convectively driven upward flow and/or to start the catalytic reaction in particular when the installation is in a cold operating state, i.e. for example while it is starting up.

To further assist the circulation of the gas stream G within the combination device 1, the gas stream G, which is guided through the return-flow zone 6 formed by the annular space 10, can be cooled. The cooling could be effected by surface coolers arranged in the return-flow zone 6. In the exemplary embodiment, however, a number of spray nozzles 14, to which a coolant K can be fed via a feed line 16, are arranged inside the annular space 10 and therefore inside the return-flow zone 6. In the exemplary embodiment, the inlet side of the feed line 16 is connected to a delivery pump 18 and to a sump pool 20 arranged in the bottom region of the recombination device 1. When the recombination device 1 is operating, sump water W collects in the sump pool 20 and can in turn be used as coolant K for the spray nozzles 14 via the feed line 16.

To set suitable operating parameters for the coolant K, the sump pool 20 is provided with a heater device 21 and with a temperature-measuring device 22. Furthermore, a heat exchanger 24, which if necessary can be bypassed via a bypass line 23 and which allows the coolant K to be recooled, is connected into the feed line 16. In addition, it is possible to provide for the coolant K supplied to the spray nozzles 14 to be used to condition the gas stream G within the return-flow zone 6. By way of example, it would be possible to feed NaOH and/or $Na_2S_2N_3$ into the feed line 16. In this case, an infeed line, which is not shown in FIG. 1, is connected to the feed line 16.

To promote the circulation of the gas stream G within the recombination device 1 still further, the as yet untreated gas stream G is fed into the reaction zone 4 at a relatively high pressure and in the desired direction of flow within the reaction zone 4, i.e. in the upward direction. For this purpose, an infeed line 26 for the gas stream G within the housing 2 opens out into an ejector 28 that is positioned appropriately on the inlet side with respect to the reaction zone 4. The ejector 28, which is provided as a gas-jet pump device, includes a number of spray nozzles 29 connected in parallel on the gas flow side and suitably oriented. In the ejector 28, on account of an appropriately selected reduction in cross section, a suitably high discharge velocity of the gas stream G into the reaction zone 4 is established.

A catalytic further purification stage 30 is integrated in the housing 2 to maintain particularly low residual limits with regard to the concentration of the residual level of combustible gas that is still entrained in the treated gas stream G' flowing out of the recombination device 1 of, for example, less than 0.1% by volume. In the exemplary embodiment, the further purification stage 30 is arranged inside the reaction zone 4 and is delimited by a suitable arrangement of metal wall sheets. This positional arrangement effects heating of the further purification stage 30 in the manner of a passive system by way of the reaction zone 4 and the heat of reaction that is released therein. As a result, a relatively high temperature level, which is favorable for the vicinity of the catalyst, is established in a self-supporting manner in the further purification stage 30, so that a particularly high level of conversion or action is achieved. A number of catalyst elements 32, which are likewise each designed as catalyst plates and likewise have a relatively large catalytically active internal surface area in the form of a washcoat based on platinum or palladium, are arranged inside the further purification stage 30. However, compared to the catalyst elements 12, the catalyst elements 32 are arranged at a relatively short distance from one another, having a mean spacing of approximately 0.5 cm.

On the outlet side, the further purification stage 30 is connected to an off-gas system 36 via a cooling unit 34. The cooling unit 34 is configured as a cooling coil which is positioned spatially inside the annular space 10, close to one of the spray nozzles 14, in such a manner that effective cooling of the cooling unit 34 is ensured by the coolant K emerging from these spray nozzles 14.

When the recombination device 1 is operating, the gas stream G which includes the gas to be treated or oxidized flows to the inlet-side or lower end of the reaction zone 4. From there, the gas stream G flows over the catalyst elements 12 arranged inside the reaction zone 4. At least partial conversion of the fraction of gas that is to be treated or oxidized and that is entrained in the gas stream G. i.e. in the exemplary embodiment the hydrogen fraction, takes place as a result of the contact with the catalytically active material, in particular platinum or palladium, at the surface of the catalyst elements 12. The hydrogen is oxidized with the available oxygen to form water. The heat that is released during this reaction effects local heating in the region of the catalyst elements 12. On account of this heating, there is a convective flow of gas in the upward direction, which, on account of the stack-like design of the cylinder casing 8 delimiting the reaction zone 4, is utilized to a particular degree to assist or maintain the upward flow in the interior of the reaction zone 4.

The gas mixture G, which consequently emerges at the outletside end of the reaction zone 4, flows into the annular space 10 that surrounds the cylinder casing 8 and that forms the return-flow zone 6. The gas mixture G then flows downward through this annular space 10. When it enters the return-flow zone 6, the gas stream G is acted on by the coolant K via the spray nozzles 14 and is therefore first cooled, and second, given a suitable selection of the coolant K, conditioned as required. The cooling of the gas stream G in this region results in additional assistance to the gas flow, which is in any case directed downward. In the lower region of the return-flow zone 6, the gas stream G moves back into the inflow region of the reaction zone 4, so that a substantially closed circuit is formed.

This circulation (or circuit) means that the gas stream G is guided over the catalyst elements 12 a number of times, so that the entrained fraction of combustible gases can be gradually broken down or treated, if appropriate with the metered addition of a reaction gas, such as for example, oxygen, while the reaction temperature, because of the dilution effect that occurs, is limited to a level of, for example, less than approximately 400° C. to 800° C., which does not cause any problems with regard to the ability of the catalytically active components to function. Furthermore, an as yet completely untreated gas stream G is injected via the infeed line 26 and becomes mixed with the gas stream G flowing back from the return-flow region 6 in the inlet region of the reaction zone 4. This mixing immediately dilutes the fraction of combustible gas that is entrained in the new gas stream G flowing in, so that even if there is a relatively high level of entrained hydrogen of, for example, 20% by volume or more, the reaction temperature within the reaction zone 4 remains limited. Feeding in the as yet untreated gas stream G via the ejector 28 additionally makes a contribution to maintaining the circulation within the recombination device 1.

If there is a relatively high gas propulsion pressure, it is also possible for the direction of flow through the reaction zone 4 to be oriented in the horizontal direction, in which case, the gas circulation is maintained by using the ejector 28.

The same amount of gas G' which has already been treated is extracted from the recombination device 1 as the as yet completely untreated gas stream G is supplied via the infeed line 26. For this purpose, a partial quantity of the gas stream G that enters the reaction zone 4 and that is already circulating in the recombination device 1 is introduced into the further purification stage 30 via the inflow opening 38. The gas stream G which is already circulating has a relatively low residual fraction of gas or hydrogen to be treated, so that for the fraction of this gas stream G' that is now discharged, reliable further treatment with a view to establishing a residual hydrogen concentration of less than 0.1% is possible. For this purpose, the part of the gas stream G' that is branched off is suitably treated further by the catalyst elements 32 arranged in the further purification stage 30, so that reliable and extensive residual conversion of the hydrogen fraction that has hitherto remained is ensured. The gas stream G' flowing out of the further purification stage 30 is then passed via the cooling unit 34, where a suitable off-gas temperature is established. Then, the gas stream G' which has now been treated is fed to the off-gas system 36, and if appropriate further dehumidification of the off-gas can also be effected, for example by using coolers, preferably cold-water coolers.

During this operation of the recombination device 1, the reaction of hydrogen with oxygen produces process water. Furthermore, the coolant K that is introduced via the spray nozzles 14 forms drops, as diagrammatically indicated in FIG. 1. These drops as well as the process water that is formed collect in the bottom area of the recombination device 1, where they form the water sump in the sump pool 20. To ensure particularly high operational safety through cooling or heating that is regulated as required in the interior of the housing 2, the sump water W located in the water sump is used to set a steam partial pressure of more than 50%. This ensures that the atmosphere inside the housing 2 is made inert to a sufficient extent under all circumstances, so that undesirable spontaneous ignition of the gas in the gas stream G is reliably avoided. Even in the event that a gas stream G with a per se unacceptable level of the combustible gas is erroneously fed in, formation of an explosive gas mixture is reliably prevented in this way. The temperature-control of the sump water W, which is required in order to establish the desired steam partial pressure can be effected on the one hand by direct heating or cooling of the water sump or on the other hand also by suitable cooling of the sump-water stream in the feed line 16, i.e. suitable operation of the heat exchanger 24 and/or suitable partial bypassing of the heat exchanger 24 via the bypass line 22. Control and operation when the coolant K or the sump water is being fed in are preferably effected by a control unit that can be programmed as desired, so that the important plant and operating parameters can be predetermined as functions, if appropriate having recourse to experience that has been acquired.

If necessary, to maintain a reliable recombination reaction, it is possible to feed in oxygen as a reaction partner. This feed of oxygen is effected as a function of measured values obtained on an ongoing basis for the relevant gas concentrations, once again by using a control unit that can be programmed as desired. The feeding in of reaction gas or oxygen may be controlled, for example, as a function of the reaction temperature and the hydrogen concentration and/or oxygen concentration at the gas outlet. In the case of pressure-relief operation, by controlling the oxygen outlet concentration it is possible to ensure an oxygen concentration of less than 4% by volume, so that safe operation of a downstream activated-carbon hold-up line is ensured even with considerable after-heat—with oxygen reactions being avoided in the activated carbon.

On account of its fundamental suitability for treating even a gas stream G with a relatively high level of entrained gases to be treated of, for example, 20% by volume or more, the recombination device 1 is particularly suitable for use in a nuclear power plant. In particular, because of the relatively compact structure and because of the combined integration of the reaction zone 4, the cooling of the gas stream G and any inerting can be provided as required in a single housing 2. This use may be effected in a particularly targeted fashion as required at locations where it is particularly likely that relatively large quantities of gases requiring treatment will be released. The flexibility in terms of the way in which the recombination device 1 can be used as well as its performance and capacity can, if necessary, be increased further using sliding pressure and sliding temperature operation.

Figure 2:
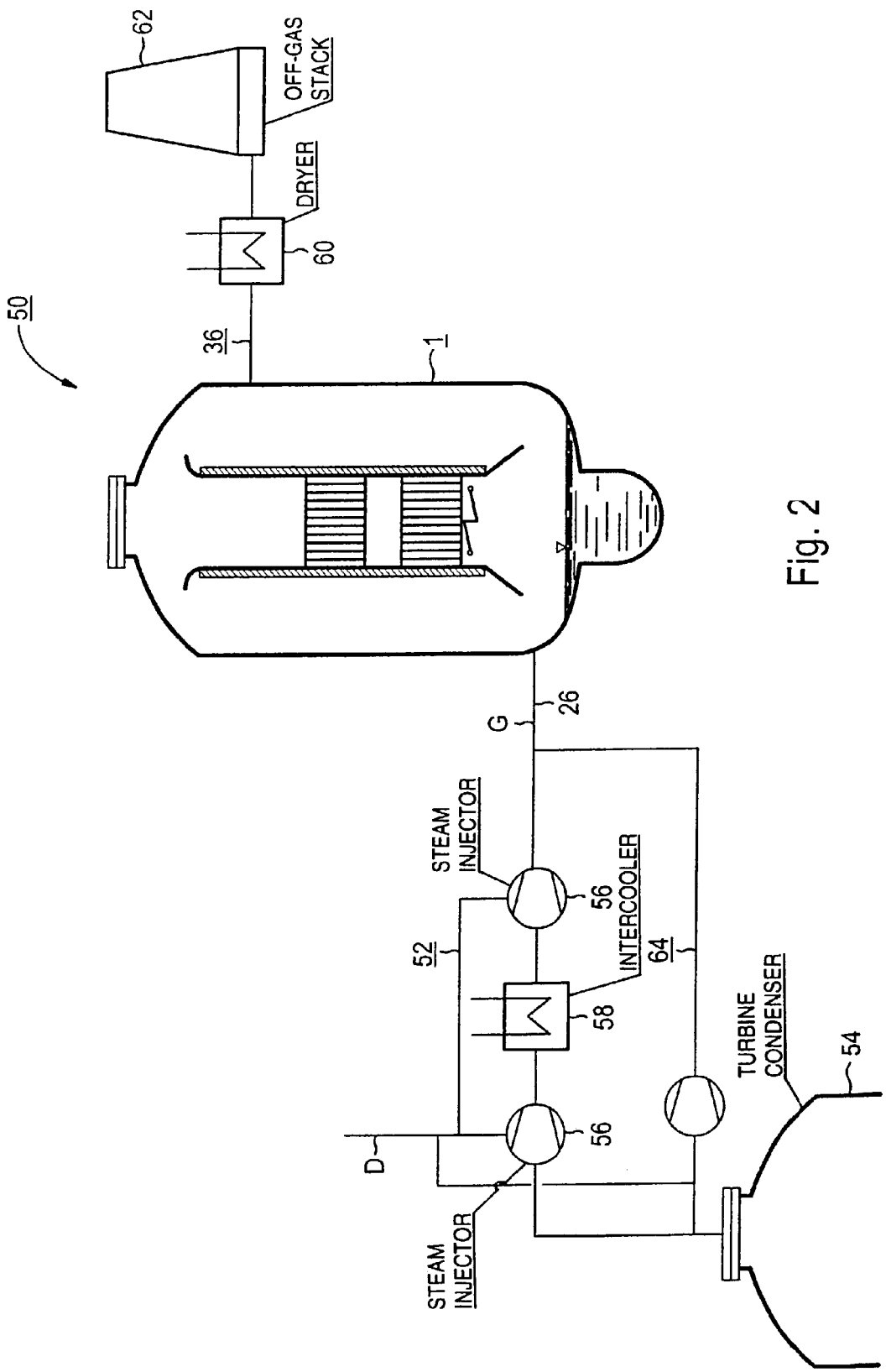
FIG. 2 is a view of a system for the catalytic oxidation of a gas which includes the recombination device shown in FIG. 1.

A particularly compact structure with a high capacity during the treatment of gases requiring treatment can be achieved if the recombination device 1—as illustrated in FIG. 2—is suitably combined with a steam injector unit 52 in a system 50 for the catalytic oxidation of a gas. The system 50, in the exemplary embodiment shown in FIG. 2, is assigned to a turbine condenser 54, only part of which is illustrated. The outlet side of the turbine condenser 54 is connected to the recombination device 1 via an infeed line 26. In the infeed line 26, the steam injector unit 52 is connected upstream of the recombination device 1. The steam injector unit 52 includes two steam injectors 56 which are connected in series in the infeed line 26 and are each supplied with infeed steam D. In the exemplary embodiment, an intercooler 58 is connected between the steam injectors 56, allowing the temperature to be adjusted as required.

On the outlet side, the recombination device 1 is connected to an off-gas stack 62 in the system 50 via a dryer 60, both of these components forming part of the off-gas system 36. If necessary, the steam injector unit 52 can be bypassed via a water ring pump system 64.

The arrangement in the system 50 allows prior inerting of the gas stream G that flows to the recombination device 1 as early as in the infeed line 26. If necessary, steam D can be supplied via the steam injector unit 52, in such a manner that a steam content of more than 50% is obtained as early as in the gas stream G flowing to the recombination device 1, so that the gas stream G has already been steam-inerted. Overall, therefore, the system 50 can be acted on by, in relative terms, very high hydrogen concentrations in the gas stream G flowing in without having to accept reductions in operational safety. Therefore, particularly with the design in accordance with the system 50, the size of the devices and components can be reduced significantly by a factor of 2 to 5 compared to previous systems while still ensuring that the quantities of hydrogen that can be expected to occur are broken down reliably. The size of the devices and components, in particular the steam injector unit 52, can be reduced still further if the recombination device 1 is arranged directly at the outlet of the turbine condenser 54, while still in the reduced-pressure region thereof.

Figure 3:
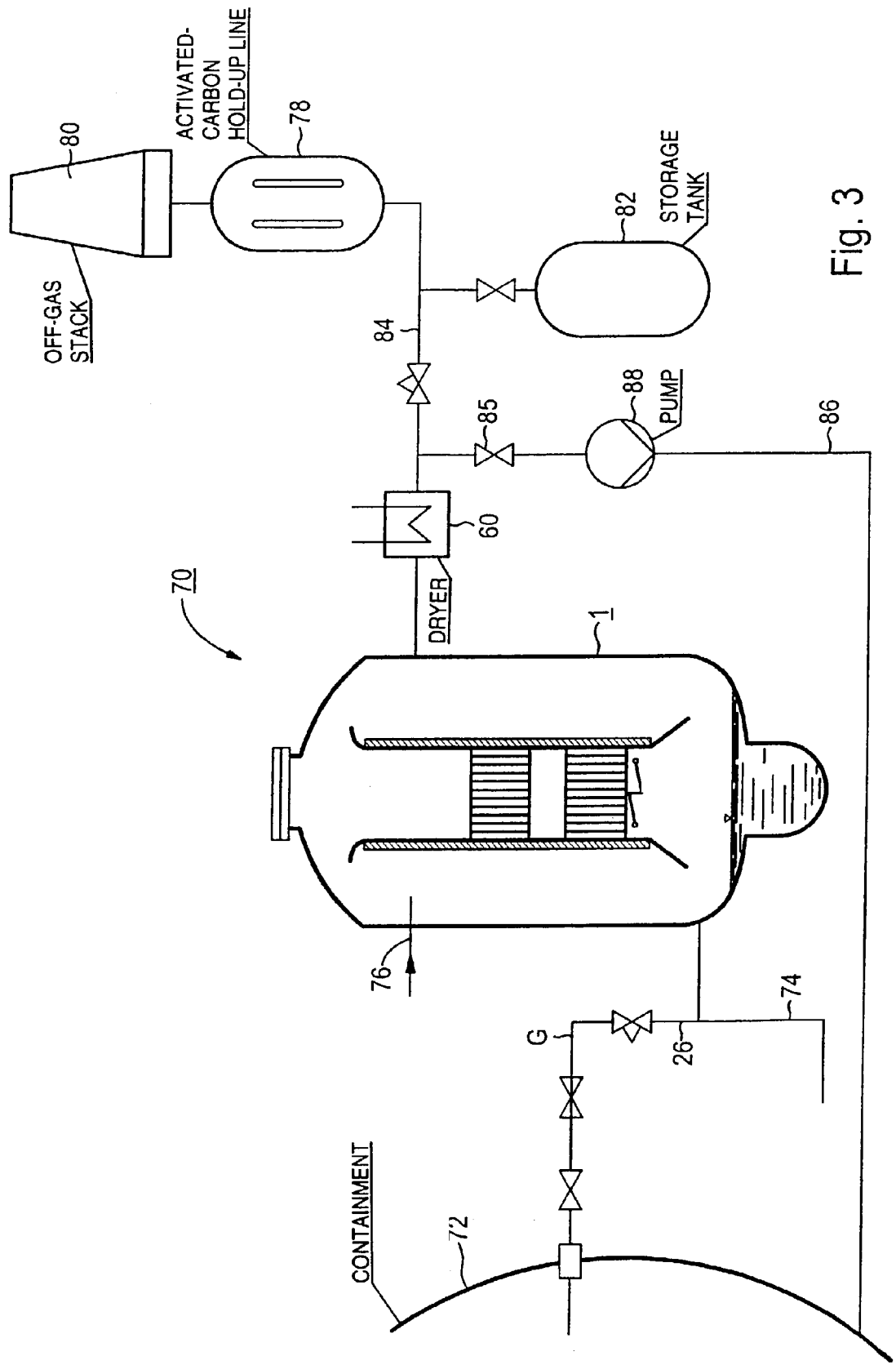
FIG. 3 is a view of an alternate system for the catalytic oxidation of a gas using the recombination device shown in FIG. 1.

In the exemplary embodiment shown in FIG. 3, the recombination device 1 is part of a system 70 for the catalytic oxidation of a gas, which is designed in particular for reliable gas treatment and activity retention in a highly loaded containment atmosphere even after relatively serious incidents. For this purpose, the system 70 in the exemplary embodiment shown in FIG. 3 is connected to the containment 72 of a nuclear power plant. Therefore, the containment 72 is directly connected, via containment isolation fittings and control fittings, to the inflow line 26 in the recombination device 1. If necessary, it is also possible for a further branch line 74 for supplying gases requiring treatment from other sources to be connected to the inflow line 26.

In the event of a particularly serious incident within the containment 72, a particularly high hydrogen concentration of, for example, 20 to 50% by volume may occur. Such a highly laden gas stream G can be fed to the recombination device 1 without operational safety being imperiled, in particular if the device is kept in an inerted operating mode. In this case, the oxidation of the entrained hydrogen within the recombination device 1 takes place over a plurality of circuits. As reaction partner, oxygen is supplied via the infeed line 76 if required. In this case, the gas stream G circulating in the recombination device 1 is also conditioned by a suitable selection of the coolant K, so that the iodine and aerosol constituents in the cooling liquid are retained.

On the outlet side, the recombination device 1 in the system 70 is connected to an off-gas stack 80 via an activated-carbon hold-up line 78. In the activated-carbon hold-up line 78, which if necessary may have been previously inerted in advance by nitrogen held in a storage tank 82, further holding-up of any rare-gas activities which may still be present takes place.

Furthermore, in the system 70, the outlet side of the recombination device 1 is once again connected to the containment 72 via a recirculation line 86, which branches off from the connecting line 84 going to the activated-carbon hold-up line 78. The recirculation line 86 can be blocked off by using a fitting 85. A drive pump 88 is connected into the recirculation line 86. Therefore, the result is a closed recirculation circuit including containment 72, recombination device 1 and recirculation line 86, by means of which, atmosphere from the containment 72 can be circulated if required. This structure if required, therefore, allows treatment of atmosphere from the containment 72 without having to release off-gases into the environment, so that, depending on the particular application, it is also possible to carry out a prior treatment of gas fractions from the containment 72.

Finally, a combined design of essential components of the systems 50, 70 shown in FIGS. 2 and 3 is also conceivable. For example, it is also possible for the system 50 to be suitably provided with an activated-carbon hold-up line 78 and/or with a recirculation line 86.

I claim:

1. A recombination device for catalytically oxidizing a gas, the recombination device comprising:
    a reaction zone having an inlet side and an outlet side;
    a return-flow zone communicating with said inlet side of said reaction zone and with said outlet side of said reaction zone such that a gas stream can be circulated;
    a common housing in which said reaction zone and said return-flow zone are configured; and
    a plurality of spray nozzles for receiving a coolant, said plurality of spray nozzles configured in said return-flow zone.

2. The recombination device according to claim 1, wherein said reaction zone is formed by a stack through which convective flow is possible.

3. The recombination device according to claim 1, comprising a plurality of catalyst elements configured in said reaction zone.

4. The recombination device according to claim 3, wherein each one of said plurality of catalyst elements is designed as a catalyst plate having a washcoat surface based on platinum or palladium; and said plurality of catalyst elements are configured at a distance of approximately 0.5 to 2 cm from one another.

5. The recombination device according to claim 1, comprising an ejector connected upstream of said inlet side of said reaction zone.

6. The recombination device according to claim 1, in combination with an off-gas system, the recombination device comprising a catalytic further purification stage integrated in said common housing; said catalytic further purification stage having an outlet connected to said off-gas system.

7. The recombination device according to claim 6, comprising a cooling unit connecting said further purification stage to said off-gas system.

8. The recombination device according to claim 7, wherein said further purification stage includes a plurality of catalyst plates; said plurality of catalyst plates configured at a distance of approximately 0.2 to 1 cm from one another.

9. The recombination device according to claim 6, wherein said further purification stage includes a plurality of catalyst plates; said plurality of catalyst plates configured at a distance of approximately 0.2 to 1 cm from one another.

10. The recombination device according to claim 6, wherein said further purification stage is designed as a stack through which convective flow is possible.

11. A system for catalytically oxidizing a gas, comprising:
    the recombination device according to claim 1; and
    a steam injector unit connected upstream from the recombination device.

12. A system for catalytically oxidizing a gas, comprising:
    the recombination device according to claim 1; and
    an activated-carbon hold-up line connected downstream from the recombination device.

13. The recombination device according to claim 1, wherein said reaction zone or said return-flow zone is connected to an oxygen feed system.

14. The recombination device according to claim 1, further comprising a sump pool arranged in a bottom region of the recombination device, said sump pool being provided with a heater device.

* * * * *